Patented Jan. 10, 1950

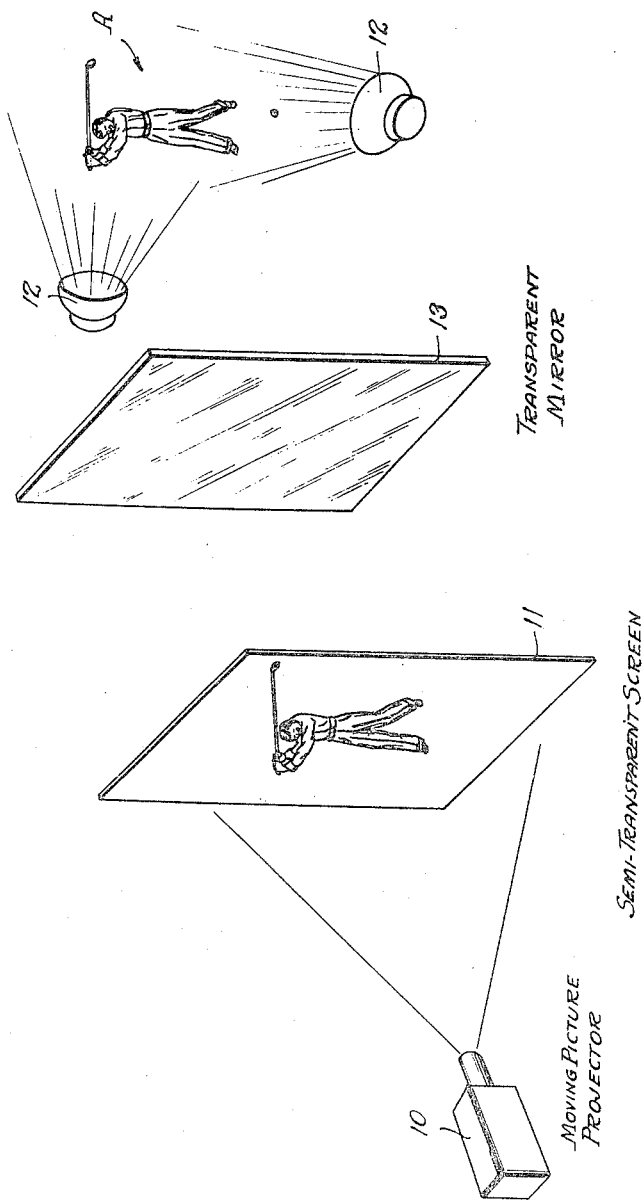

2,494,000

UNITED STATES PATENT OFFICE 2,494,000

METHOD AND MEANS FOR TEACHING MANUAL SKILLS

Clarence H. Robertson, West Lafayette, Ind.

Application February 11, 1946, Serial No. 646,894

7 Claims. (Cl. 35—29)

My invention relates to the learning of manual skills and it has particular relation to the learning of such skills which require coordination in time and position of parts of the body and of the associated equipment for successfully performing the same.

The game of golf requires a high degree of coordination of the movements of the hands, arms, body and legs of the golfer if the ball is to be driven consistently in the proper direction and to the range corresponding to the particular situation involved. Similar coordination is required for the proper handling of a baseball bat, for the kicking of a football, for the assembly of mechanical devices and other like skills.

Each of these and similar manual skills involves the continuous coordination of the parts of the body involved. This is essential in order to obtain the maximum effect that is possible, such as a long drive in golf or a larger number of assembled mechanical devices. That is, it is not sufficient to demonstrate different individual positions. This can be accomplished by pictures in a book or posters or the like.

Rather, in order to learn with a minimum of time and effort and a maximum degree of success, the skill should be learned or developed in the same manner that it is exercised. The learner or pupil from the very beginning, can develop the required sense of coordination in time and position rather than having to acquire it after having been shown or taught various more or less unrelated steps in the performance of the skill.

Accordingly, among the objects of my invention are: to provide for comparing, with a continuous showing of an expert exercising a particular skill, a showing of the manner in which a learner or pupil accomplishes the same skill so that the pupil can adjust or vary his movements to follow as closely as he can those of the expert; to project a moving picture of an expert performing a skill, such as swinging a golf club, on a screen and superimposing on the continuously moving image of the expert the continuously moving image of the learner of the skill as he endeavors to match his movements in time and position with those of the expert; and to accomplish the superimposition of the images by reflecting the images of the learner or pupil from the screen.

In accordance with my invention I first make a moving picture film of an expert performing the skill or part thereof that is to be the subject of instruction of a learner or pupil. For example, if the correct manner in which a driver should be swung in driving a golf ball off of a tee is to be learned, a moving picture camera is used to film the action of an expert or professional golfer in addressing the ball, swinging the driver back and then forward and finishing the stroke. The film, as used for instruction purposes, can be made up of repeated sequences of the same action so as to permit the pupil to repeat and practice it as may be desired.

Now provision is made for projecting the film onto a screen where it can be viewed by the learner or pupil. However, instead of the pupil merely watching the performance of the expert and then from memory attempting to duplicate his actions, provision is made, according to my invention, for simultaneously matching the movements of the learner or pupil with those of the expert as projected on the screen, so that a continuous comparison therewith can be made.

This is accomplished by reflecting the movements of the learner or pupil from the screen where he can watch the same and superimposing his continuously moving image on the projected image of the expert, constituting a standard. The learner or pupil attempts to match, as nearly as possible, his movements as reflected on the screen with those of the expert so as to be able to accomplish the same results as he accomplishes. By this means the learner or pupil can observe wherein his movements depart from the standard and he can take the necessary steps to alter his actions so as to make them conform to those of the expert.

Thus by comparing the continuously changing image of the standard with the image of the learner or pupil, who attempts to duplicate the actions of the standard in time and position, he is enabled to learn rapidly and quickly the proper manner in which the skill is performed. The learning process is thereby continuous and not intermittent and it proceeds easily and logically to the degree of skill that the learner or pupil is capable of acquiring.

I am aware that it has been proposed to superimpose certain hair styles and the like on the features of a customer therefor. One manner of accomplishing this is shown in Patent No. 2,061,378 to Henze et al. Provision there is made for reflecting the face of the customer on a screen with the individual's own hair blanked out. By means of lantern slides or film strip and a projector various forms of hair styles are projected on the screen to take the place of the customer's own hair. The customer can compare the appearance of various forms of hair styles and select the one considered to be most becoming.

However, this is a static rather than a dynamic comparison. No consideration is given to a comparison in time and position of the movements of a standard with those of a learner or pupil who is interested in acquiring a manual skill requiring close coordination of parts of the body and of equipment for performing the same. In fact such a dynamic comparison could not be made with the patented construction.

My invention is disclosed more fully in the following detailed description taken together with the accompanying drawing, in which the single figure illustrates a preferred manner of practicing my invention, as viewed from the projector side of the screen.

Referring now particularly to the drawing, it will be noted that a moving picture projector 10 is provided for projecting onto a screen 11 which acts both to reflect light from one side and to transmit light coming from the other side a moving picture or series of images of an expert in the particular skill involved as he performs the same. For purposes of illustration one position of a series of positions of a golfer is shown as he executes the driving of a golf ball. It will be understood that, instead of a static picture on the screen 11, there is shown thereon a moving picture or series of continuously changing images of the person performing the skill. Moreover, it will also be understood that the images appear on the opposite side of the screen 11 in reversed relation to that on the side facing the projector 10. The utility of this will be apparent presently.

For practicing my invention a moving picture film can be prepared of a professional golfer as he drives off of a tee. Of course, this will show the critical parts of the swing comprising the address, the top of the back swing, the impact of the ball and the finish of the stroke. The moving picture will also show the correlation of the parts of the body of the professional as he moves the golf club through these various positions.

Now, it is desired that the pupil be instructed in performing the skill. As previously indicated the pupil could merely watch the performance of the professional on the screen and then attempt to duplicate it from memory. However, this has not proved to be satisfactory and, in accordance with the present invention, provision is made for the pupil to continuously compare his movements with those of the professional or expert so that he can continuously learn and improve his skill.

As shown in the drawing the pupil is positioned at "A" and flood lights 12 may be provided which will illuminate him and facilitate the learning process. Between the screen 11 and the pupil at "A" there is positioned a mirror 13. Preferably the mirror 13 is formed of transparent glass such as plate glass. The mirror 13 is shown in the drawing midway between the pupil and the screen 11. Obviously the mirror may be placed at different locations with respect to the screen 11 depending upon the situation. The laws of optics will, of course, control its position, the necessary size of the image projected onto the screen 11, and the size of the reflected image of the pupil.

Now it will be apparent that, in so far as the pupil at "A" is concerned, he will view his image by means of the transparent mirror 13 at a position as far in back of the mirror as he is located in front of it. This follows from the laws of optics involved.

Since the screen 11 is positioned on the opposite side of the mirror 13 at a distance which is equal to the distance that the pupil is spaced from the other side of the mirror 13, the image of the pupil will appear on the screen 11. Thus two images will appear on the screen 11. One of these is projected from the moving picture projector 10 and the other is produced on the screen 11 by action of the mirror 13. Since the projected image is reversed as it appears to the pupil from that illustrated in the drawing, as pointed out hereinbefore, and since the pupil's image appears to him to be reversed, the two images can be made to coincide.

The pupil takes such a position that his image is superimposed on that of the professional or expert which is projected onto the screen 11 all as viewed by the pupil. It will now be obvious that if the pupil can duplicate exactly in time and position the movements of the various parts of the body of the professional or expert, he will drive the ball with the same degree of skill. The movements of the professional or expert thus constitute a standard with which the pupil can compare, continuously his corresponding movements. The pupil can make such alterations in his movements as may depart from those of the standard so as to correct the errors or discrepancies therein.

In order that the sequences of movements for a particular skill may be repeated, the film strip in the moving picture projector 10 may comprise a number of repeated sequences of the same movement or a film of a sequence may be arranged as a linked belt, but it will be obvious that the number of sequencies is limited only to the size of the roll of film which can be used with the moving picture projector 10. In this manner the pupil can repeat the performance of the skill as often as desired.

It will be understood that the film strip may be provided with a sound track and that a verbal explanation of the performance of the skill can accompany the actual visual demonstration on the screen 11.

While the present invention has been illustrated in connection with the learning of a particular stroke in the game of golf, it will be obvious that the same method and apparatus can be used in connection with learning other strokes of golf. Also the apparatus and method may be used for learning other skills such as batting a baseball, kicking a football and the like.

It can also be used to learn how to assemble simple or complicated mechanisms in a factory. In such a situation an expert would assemble the mechanism and a moving picture would be made of the various steps in the assembly. At the same time the operator or another person could make a description of the operation, and this can be recorded on a sound track to accompany the projection of the performance of the skill on a screen. The pupil in learning to assemble the mechanism would be placed in front of a mirror and would attempt to superimpose his movements in making the assembly on those of the skilled operator as projected onto the screen.

It will be obvious to those skilled in the art that other methods and means than those specifically disclosed herein may be employed in practicing the present invention. Accordingly, it is intended that all matter shown in the accompanying drawing or described hereinbefore shall be interpreted as illustrative and not in a limiting sense.

I claim as my invention:

1. Method of learning a manual skill requiring coordination in time and position of parts of the body which comprises, establishing images of a standard sequence of timed movements, and matching as nearly as possible such standard sequence of images by superimposing thereon the continuously changing image of a pupil learning the skill.

2. Method of learning a manual skill, such as the swinging of a golf club or the like, requiring coordination of movement of various parts of the body and of equipment in time and position which comprises, projecting onto a screen a moving picture of a skilled performer swinging a golf club or the like, and matching as nearly as possible the images projected onto the screen by superimposing thereon the successive images of a pupil learning the skill as he endeavors to accomplish the same action as the skilled performer.

3. Method of comparing the manner in which two performers of a manual skill, such as the swinging of a golf club or the like, accomplish the same which comprises, projecting onto a screen a moving picture of the action of one of the performers, and superimposing thereon the continuously changing images of the other performer in accomplishing the same skill.

4. Method of comparing the manner in which two performers of a manual skill, such as the swinging of a golf club or the like, accomplish the same which comprises, projecting onto a screen a moving picture of the action of one of the performers, and reflecting from the screen the continuously changing images of the other performer in accomplishing the same skill.

5. The method, as set forth in claim 4, wherein the reflected images are superimposed on the projected images.

6. Apparatus for learning a manual skill comprising, in combination, a screen, a moving picture projector for projecting onto the screen a moving picture of an expert performing the skill, and a mirror for reflecting from the screen the continuously changing image of a pupil as he duplicates the performance of the expert as projected onto the screen.

7. The invention, as set forth in claim 6, wherein the mirror is a transparent mirror and it is located between the screen and the pupil.

CLARENCE H. ROBERTSON.

REFERENCES CITED

The following references are of record in the file of this patent:

UNITED STATES PATENTS

| Number | Name | Date |
|---|---|---|
| 1,199,980 | Gilbreth | Oct. 3, 1916 |
| 1,410,811 | Lewis | Mar. 28, 1922 |
| 1,822,808 | Gordon | Sept. 8, 1931 |
| 1,973,665 | Shannon | Sept. 11, 1934 |
| 2,159,035 | McGrath | May 23, 1939 |
| 2,387,021 | Hendershot | Oct. 16, 1945 |
| 2,374,401 | White | Apr. 24, 1945 |
| 2,402,109 | Williams | June 11, 1946 |

FOREIGN PATENTS

| Number | Country | Date |
|---|---|---|
| 7,522 | Great Britain | 1913 |